United States Patent [19]

Nguyen Handfield et al.

[11] Patent Number: 5,281,790
[45] Date of Patent: Jan. 25, 1994

[54] PROCESS OF IMMOBILIZING ASHES BY VITRIFICATION THEREOF IN A PLASMA REACTOR

[75] Inventors: My D. Nguyen Handfield, Shawinigan; Michel G. Drouet, Mt. St. Hilaire, both of Canada

[73] Assignee: Hydro Quebec, Montreal, Canada

[21] Appl. No.: 915,643

[22] Filed: Jul. 21, 1992

[30] Foreign Application Priority Data

Jul. 24, 1991 [CA] Canada .................................. 2047807

[51] Int. Cl.⁵ ................................................ B23K 9/00
[52] U.S. Cl. ........................... 219/121.38; 219/121.37; 219/121.59; 219/121.48; 75/10.19; 110/243; 110/250
[58] Field of Search ...................... 219/121.36, 121.37, 219/121.38, 121.4, 121.59; 75/10.19, 10.22; 373/18, 22; 110/242, 243

[56] References Cited

U.S. PATENT DOCUMENTS

| | | | |
|---|---|---|---|
| 4,002,466 | 1/1977 | MacRae et al. | 219/121.360 |
| 4,466,824 | 8/1984 | Gauvin et al. | 75/10 R |
| 4,644,557 | 2/1987 | Ebeling et al. | 373/22 |
| 4,801,435 | 1/1989 | Tylko | 373/22 |
| 5,017,754 | 5/1991 | Drouet et al. | 373/22 |
| 5,046,145 | 9/1991 | Drouet et al. | 219/121.36 |
| 5,090,340 | 2/1992 | Burgess | 373/22 |
| 5,136,137 | 8/1992 | Schlienger | 219/121.590 |

Primary Examiner—Mark H. Paschall
Attorney, Agent, or Firm—Foley & Lardner

[57] ABSTRACT

Disclosed is a process for immobilizing ashes by vitrification thereof in a plasma arc reactor, which is very efficient to treat ashes and any other pulverulent residues containing toxic leachable components that may be a source of pollution. The process makes use of a plasma reactor of the falling film type, in which an axial transferred or non-transferred arc melts and treats a load tangentially injected or otherwise blown in a cyclonic manner in a sleeve while this load falls down by gravity along the wall of the sleeve and accumulates at the bottom of the reactor in the form of a liquid bath. The load that is fed into the reactor consists of the ashes exclusively if they contain a sufficient amount of silica to make them self-vitrifying, or of a mixture of ashes with silica or another glass-forming agent. The temperature of the bath of glass that accumulates at the bottom of the reactor is controlled in a very precise and adequate manner to reduce as much as possible the formation of fumes and the risk of evaporation. The glass that is so obtained may be removed in a continuous manner from the bottom of the reactor, or poured out of the same at regular interval.

8 Claims, 2 Drawing Sheets

PROCESS OF IMMOBILIZING ASHES BY VITRIFICATION THEREOF IN A PLASMA REACTOR

BACKGROUND OF THE INVENTION a) Field of the Invention

The present invention relates to a process for immobilizing ashes by vitrification thereof in an arc plasma reactor.

In the following description, "ashes" means any kind of ashes or powder material coming from incinerators or from clinkers.

b) Brief description of the prior art

It is well known that the ashes coming from incinerators, in particular those of hospital or waste water treatment plants, may often be classified as "hazardous" because of their high concentration in toxic components, in particular heavy metals.

It is also known that the incineration of domestic sludges or of sludges coming from waste water treatment plants is a method that is more and more used, as the other conventional methods become less and less accessible or acceptable. Such conventional methods include landfill, which is less and less used because of the lack of proper dump sites, spreading of the waste into the fields, and/or disposal of it into the rivers or oceans, which also becomes less and less acceptable because of the pollution that it generates.

Incineration is already used in a very extensive manner in some European countries, because it permits to a substantial reduction in the amount waste, especially sludges. Even for hazardous waste, incineration has become a preferential treatment. However, a problem with this method, is that it generates substantial amount of ashes that must be disposed of. This can only be done by solidification or stabilization of the same, such having to be done in a field that is more and more subject to regulations.

The stabilization treatment that is presently commonly used, consists in stabilizing the waste with a binder consisting of cement, lime, absorbents and thermoplastic or duroplastic materials.

If this method is efficient in some cases, it does not provide full protection. Accordingly, new methods have been developed in order to encapsulate the waste in a more efficient manner.

Amongst these new methods, it has been suggested to immobilize the waste by vitrification thereof, i.e. to proceed to an encapsulation of the waste within glass, in order to isolate the same from the surrounding before disposal of them. This method has first been used for nuclear waste. However, it has also been tried for ashes and is presently being used in an industrial or semi pilot scale by at least two companies, namely DAIDO STEEL and SKF.

In its Japanese plant, DAIDO STEEL proceeds to the vitrification of ashes in an arc plasma reactor that may treat up to 25 tons of waste a day. In SKF premises where the project is still under testing, 250 kg of ashes per hour are vitrified in a blast furnace heated with a plasma torch. In this connection, it is worth mentioning that plasma torches are more and more used for the destruction of waste, because of the high temperature they generate, the high energy density they have, and their low thermal inertia.

SUMMARY OF THE INVENTION

The present invention relates to a new process for immobilizing ashes by vitrification thereof, which process uses and takes advantages of a type of arc plasma reactor that is very specific but well known, namely an arc plasma reactor of the falling film type, comprising a sleeve having a vertical axis in which an axial, transferred or non-transferred arc melts and treats a load tangentially injected or otherwise blown in a cylonic manner in the sleeve while this load falls down by gravity along the wall of the sleeve.

Arc plasma reactors of the above mentioned type which can be used in accordance with the present invention, are disclosed by way of example in U.S. Pat. No. 4,466,824 assigned to the Applicant; U.S. patent application Ser. No. 399,997 filed on Aug. 29, 1989 in the name of the Applicant and which issued as U.S. Pat. No. 5,017,754 and in U.S. patent application Ser. No. 512,166 filed on Apr. 20, 1990 also in the name of the Applicant. Another example of a reactor of the very same type is disclosed in U.S. Pat. No. 4,002,466 to BETLEHEM STEEL.

More particularly, the object of the invention is to provide a process for immobilizing ashes by vitrification thereof in a plasma reactor of the above mentioned type.

The process according to the invention is based on a discovery made by the inventors that, thanks to their configuration and the way they are fed, the arc plasma reactors of the above mentioned type are very efficient for treating fine particles, and thus are well adapted for the vitrification of ashes, inasmuch as they do not require preliminary agglomeration of the ashes which, accordingly, may be treated as such, i.e. in pulverulent form, with a minimum of loss due to gas carryover.

When an arc plasma reactor as disclosed in U.S. Pat. No. 4,466,824 is used (PLASMACAN process), the ashes and the optional glass forming agents are tangentially injected on top of the sleeve. The arc is generated by a torch and transferred from the hot cathode of this torch to an anode at the bottom of the reactor.

When an arc plasma reactor as disclosed in U.S. patent application Ser. No. 399,997 is used (PLASMABEC process), the ashes and the optional glass forming agents are fed on top of the sleeve and entrained by the plasma gas of a vortex torch that gets out from the torch with a whirling motion. In such a case, the torch is provided with copper electrode cooled with water.

When an arc plasma reactor as disclosed in U.S. patent application Ser. No. 512,166 is used (PLASMA-GRAPHITE process), the ashes and the optional glass forming agents mixed therewith are fed in the same way as in the above PLASMACAN and/or PLASMABEC processes. The only difference lies in the use of a graphite electrode whose forward motion is controlled as a function of its wear. In such a case, the arc extends between this graphite electrode and an other electrode is located at the bottom of the reactor. Of course, if the liquid bath accumulating at the bottom of the reactor is to be removed from the same through the bottom of this reactor, the other electrode(s) must be located onto the lateral walls of the furnace, above the upper level of the liquid bath.

As indicated hereinabove, the arc plasma reactors of the type disclosed hereinabove are known per se. Accordingly, they shall not be described in further details hereinafter, unless otherwise required in the following description.

In accordance with the invention, the ashes to be fed into the plasma reactor must be mixed in given proportions with one or more glass-forming agents known per se such as, silica or other silica derivatives, used alone or in admixture with lime, and/or sodium carbonate, unless the ashes contain sufficient silica to make them self-vitrificating. Once admixed with one or more vitrificating agent(s), the ashes are tangentially injected or otherwise fed into the sleeve of the reactor. There, the glass-forming agent(s) or silica contained in the ashes melt and form together with the remaining of the ashes a falling film that falls down by gravity along the wall of the sleeve and accumulates at the bottom of the reactor to form a liquid bath of glass which is electrically conductive because of its temperature and the waste it contains, and which thus may be used whenever if desired for an arc transfer.

The glass that is so obtained and in which the ashes are absorbed or "dissolved", can be poured out of the reactor at given intervals, and then cooled and recovered in a solid form. Alternatively, the bath of glass may be drawn off in a continuous manner through the bottom of the reactor, in such a manner as to form a continuous glass cylinder that may be cut to a predetermined length. The glass after stabilization may be used for different purposes, such as, as insulation material or filling material.

The fumes that are generated inside the reactor may be recovered by filtering the off-gas and returning them to the reactor. In the case where substantial amount of plasma gas is used, such as when use is made of a PLASMACAN or PLASMABEC reactor, such gas may also be recycled.

The process according to the invention can be used for vitrifying any kind of ashes coming from incinerators, thermal plants or other combustion units. It can also be used for vitrification of any pulverulent residues containing a lixiviable toxic component that is a threat for the environment. Indeed, the process according to the invention provides a full and efficient encapsulation of the impurities in glass, the vitrification causing incorporation of the ashes and their oxides in a three dimensional network of the polyhedral type, formed with the atoms that constitute the basic structure of glass. Notwithstanding the fact that some dissolved cations may affect the strength of this structure, the glass loaded with ashes or oxides is, in most of the case, much more "resistant" then the ashes or oxides alone.

The process according to the invention has the advantage of being very easy to use and adapt. Because there is great variation in the composition of the ashes depending on their source, the glass composition may be varied and adjusted within a very large range.

The process according to the invention may also be used for the treatment of hazardous waste.

BRIEF DESCRIPTION OF THE DRAWINGS

The invention and its advantages will be better understood upon reading the following non-restrictive description made with reference to the accompanying drawings in FIGS. 1 and 2, which are schematic representations of plasma reactor of the falling film type, used for the vitrification of ashes, with and without recycling of fumes, respectively.

DESCRIPTION OF TWO PREFERRED EMBODIMENTS

Figure 1:
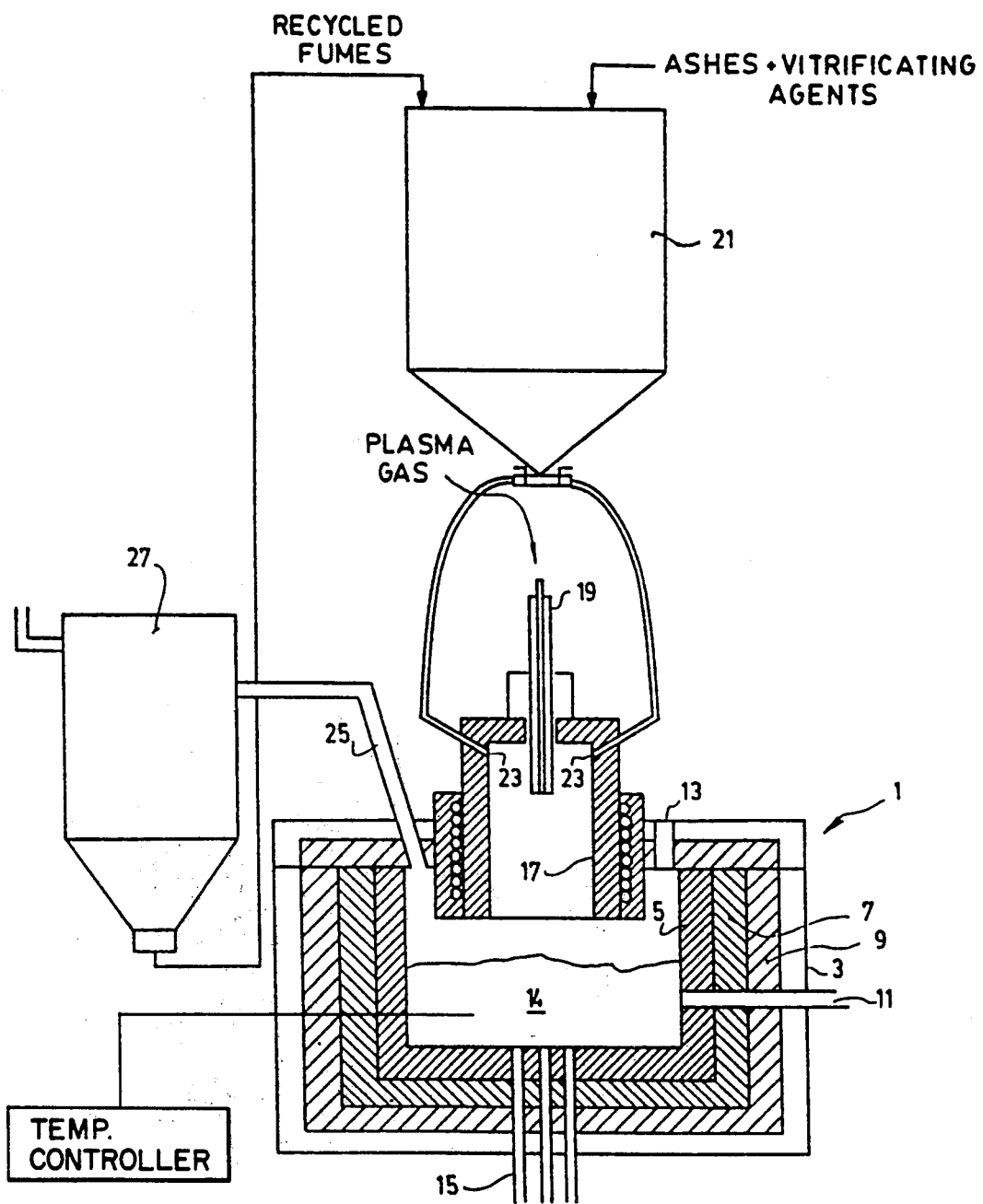

The plasma reactor 1 shown in the drawing comprises a crucible 3 having walls that can be made of several layers of different refractory materials 5, 7 and 9 in order to achieve high thermal insulation together with suitable mechanical and chemical resistance. The crucible 3 is provided with a lateral tap hole 11 and with a door 13 on top, through which waste, other than ashes to be encapsulated in glass may be introduced.

The crucible 3 is intended to receive and keep a bath of molten glass 14 hot. It has a bottom provided with one or more electrodes 15 and an upper part provided with a vertical sleeve 17 cooled or not with water and coaxially extending over the electrodes 15.

A graphite electrode, a hot cathode torch or a copper electrode torch 19 is mounted on top of the sleeve 17, vertically on the top of the same. This electrode or torch can be electrically connected to the electrodes 15 to form a transferred arc from the torch to the bottom electrode. A plasma gas may be injected for this purpose.

Figure 2:
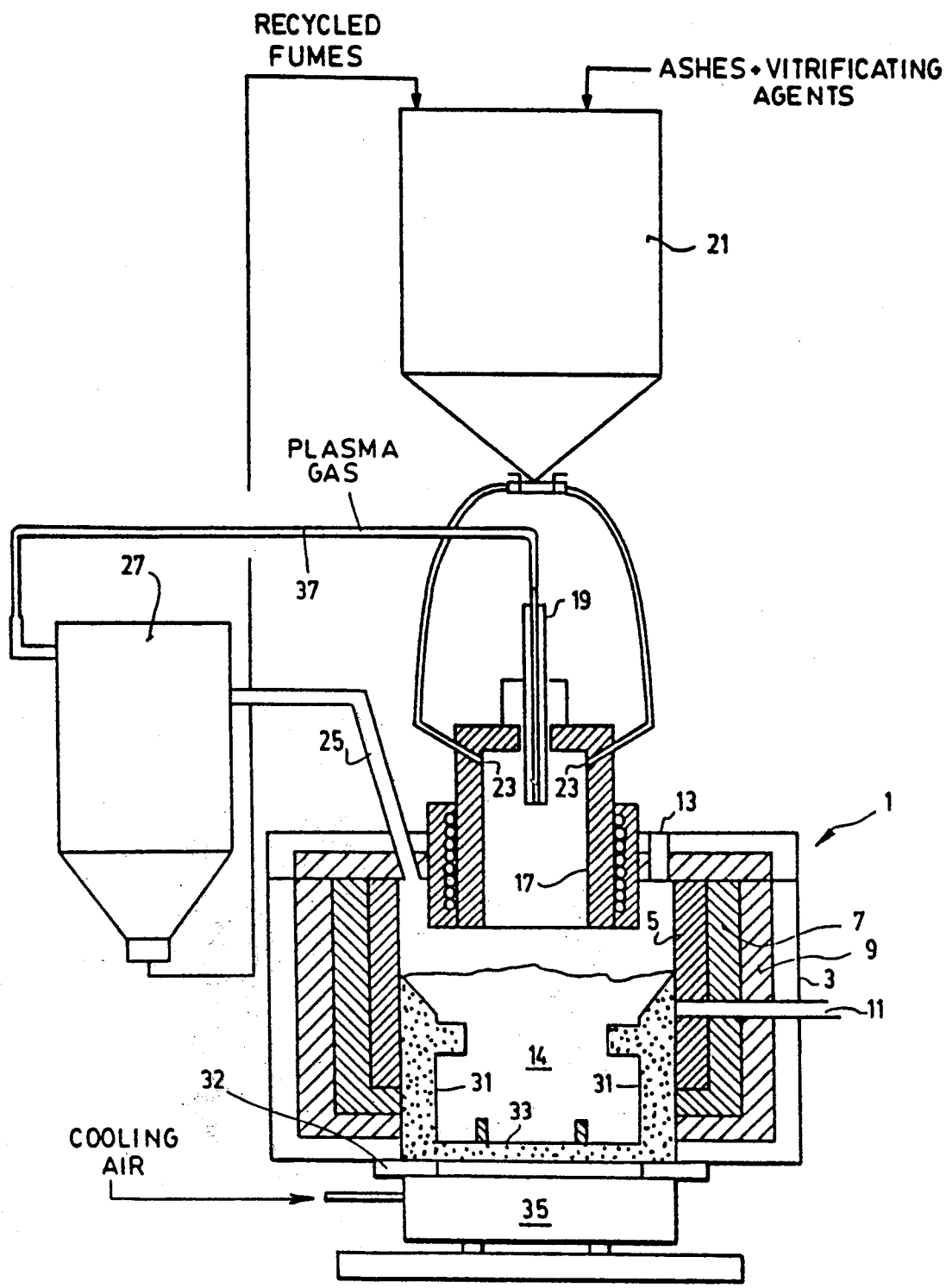

When glass is to be drawn of through the bottom of the crucible, use can be made of electrodes 31 made of graphite or any other conductive material, located in the lateral wall of the reactor and connected to a current collector 32 as shown in FIG. 2. The bottom 33 of the crucible can be made of graphite and is downwardly movable by means of a mechanical system which can be used to lift it up and down at a controlled speed. A cooling system 35 is used to control the temperature gradient in the bath of glass in order to facilitate drawing of the same. When the bottom of the crucible is moved down, the glass therein moves away from the arc and solidifies to form a glass column. When the column reaches a given length, knives (not shown) may be used to grasp it while a knife system (not shown) is used to cut off its lower end. This particular assembly makes it possible to operate the system in a continous and efficient manner.

The ashes to be vitrified are supplied with or without glass-forming agents known per se in a feeding system 21 in which they are mixed before being fed or injected at 23 on top of the sleeve to form, upon melting, a film falling onto the internal surface of the sleeve 17.

The fumes and gases escaping from the reactor are fed by a duct 25 to a dust filter 27 where dust contained therein is extracted and recovered from the fumes and then recycled to the feeding system 21. When the volume of gas used is high, it may be recycled as plasma gas 37 as shown in FIG. 2.

EXAMPLE 1

Tests were conducted in a plasma reactor as described hereinabove, entirely cooled with water and operated in an transferred arc mode with a water cooled cathode having a thoried-tungsten tip. The ashes to be vitrified were injected tangentially in the sleeve, together with a given amount of glass-forming agent, using a carrying gas to do so.

In order to facilitate the melting process and form a good glass matrix of glass, silica was added to the ashes prior to feeding them to the reactor. The ashes were injected tangentially into the sleeve at one location only. The flow of carrier gas ($N_2$), was 15 liter per minute for the first test, and 25 liter per minute for the subsequent tests. The flow of plasma gas (N₂), was also equal to 15 liter per minute.

The operating power of the torch ranged from 19 to 35 kW, with operating times of 4 to 10 minutes. The percentage of silica added to the ashes varied from 30 to 50% by weight.

TABLE 1

Experimental conditions during the tests carried out with addition of silica

| | Test No. | | | | |
|---|---|---|---|---|---|
| | 1 | 2 | 3 | 4 | 5 |
| Current (A) | 200 | 250 | 300 | 300 | 250 |
| Voltage (V) | 115 | 100 | 116 | 112 | 76 |
| Power (kW) | 23.00 | 25.00 | 34.80 | 33.60 | 19.00 |
| Feeding rate (kg/h) | 2.83 | 3.86 | 5.76 | 3.48 | 3.95 |
| Feeding time (min.) | 10 | 10 | 7 | 4 | 8 |
| % of added silica | 50 | 50 | 50 | 30 | 40 |
| Color of glass | green | green | green | black | green |

EXAMPLE 2

Other tests were carried out in a reactor of the above mentioned type, provided with a refractory in order to improve its thermal effiency. This reactor was provided with a graphite electrode and was operated in a transferred arc mode.

Analysis of the injected ashes showed that the same contained already a high concentration of silica (from 18 to 23% according to the samples). Thus, self-vitrifying tests were carried out using only lime as an additive in order to fluidize the liquid bath (the basicity index that was targeted was 1.0).

As the ashes also contained iron oxides in high concentration (40 to 48%), tests were also carried out to tentatively recover iron by adding from 10 to 20% of graphite powder to the ashes prior to injecting them.

The reactor was preheated until its walls reached a temperature of 400° C. The arc was then lengthened to reach a total length of 22 cm. When the temperature of the cooling water at the outlet of the water cooled sleeve was substantially constant (after 3 to 4 minutes), injection of the ashes was started.

As aforesaid, the ashes were mixed with 8% of lime prior to injection and, in some tests, with graphite powder. They were injected at two diametrically opposite locations and the flow of carrier gas was 25 liter per minute.

Nitrogen was used as carrier gas for tests Nos. 6, 7 and 8 whereas argon was used for test No. 9.

These tests were carried out with power of 24 to 32 kW, and feeding rate of 3.2 to 6.2 kg/h. The feeding time of the longest test was 55 minutes.

TABLE 2

Experimental conditions of tests carried out within addition of silica

| | TEST NO | | | |
|---|---|---|---|---|
| | 6 | 7 | 8 | 9 |
| Current (A) | 200 | 270 | 200 | 240 |
| Voltage (V) | 120 | 120 | 160 | 100 |
| Power (kW) | 24.00 | 32.40 | 32.00 | 24.00 |
| Feeding rate (kg/h) | 6.22 | 4.40 | 3.66 | 3.20 |
| Feeding time (min.) | 13.5 | 30 | 25 | 55 |
| PERCENTAGE | | | | |
| % CaO | 8 | 8 | 8 | 8 |
| % graphite powder | 0 | 10 | 20 | 0 |

The glasses that were obtained by self-vitrification were black.

RESULTS AND INTERPRETATION OF THE TESTS REPORTED IN EXAMPLES 1 AND 2

Composition of the Obtained Glass

Table 3 hereinunder shows the concentration of metals in the injected ashes during the above reported tests, and the concentration of the same metals in the glass that were obtained.

TABLE 3

METALS PRESENT IN THE ASHES AND OBTAINED GLASSES

| Element | Ashes | Test 2 | Test 3 | Test 4 | Test 5 | Test 6 | Test 7 | Test 8 | Test 9 |
|---|---|---|---|---|---|---|---|---|---|
| Arsenic | 4.57 | 0.5 | 0.5 | 1.4 | 0.5 | 2.87 | 10.08 | 0.79 | 0.015 |
| Cadmium | 2.08 | 1.3 | 0.44 | 1.37 | 0.38 | 1.48 | 0.48 | 0.47 | 0.037 |
| Chromium | 299 | 308 | 138 | 410 | 44 | 286 | 146 | 532 | 0.06 |
| Copper | 820 | 347 | 174 | 450 | 206 | 825 | 226 | 121 | 0.355 |
| Mercury | 3 | <0.01 | <0.01 | <0.01 | <0.01 | <0.01 | <0.01 | <0.01 | <0.003 |
| Nickel | 72 | 25 | 25 | 66 | 20 | 71 | 57 | 20 | 0.044 |
| Lead | 355 | 32 | 21 | 62 | 8.5 | 313 | 38 | 34 | 0.044 |
| Selenium | 0.43 | <0.20 | <0.2 | 0.3 | <0.2 | 0.2 | 2.6 | 2.4 | 0.004 |
| Zinc | 510 | 37 | 13 | 63 | 2.6 | 438 | 8.07 | 5.2 | 0.71 |
| Sulfides | 60 | 5 | 20 | 305 | 16 | 6 | 1670 | 480 | |
| Cyanides | 4.2 | 6.3 | 0.92 | 0.52 | 0.2 | 0.08 | 0.23 | 0.13 | |

*The concentration of metals is expressed in ppm; the concentration of sulfides in µg/g of S and that of cyanures in ppm of CN.

The above results show that the composition of the obtained glasses substantially varied depending on the conditions of operation.

The best results were obtained in test No. 6, where most of the deliterious metals were almost entirely encapsulated into the glass.

This substantial variation in the obtained results can be explained as follows: in the absence of any suitable control during melting, volatile elements, such as lead, selenium or zinc evaporate from the liquid bath and thus "passe" in the fumes. Of course, by suitably controlling the temperature of the bath, one may succeed in keeping all these volatile elements into the glass as was shown in test No. 6 in which the glasses obtained has about the same composition as the initial ash.

Accordingly, it is useful and important according to the invention to recycle the fumes just in case the control of the temperature of the bath would not be sufficient to provide proper immobilization of the deleterious element.

The above test reports also show that it is useful, important and actually necessary to extensively "test" any selected arc plasma reactor in order to determine optimum conditions of operation (as obtained in test No. 6 hereinabove) i.e. to determine the conditions where the losses are minimized and energy is adequately adjusted to provide uniform heating of the liquid gas and to reduce to a maximum extent the risk of selective evaporation.

Melting tests were also carried out with a non-transferred arc generated by a PEC torch of 80 kW. The feeding rate was 300 g/minute. The molten glass was drawn off of the bottom of the crucible at a speed up 1 cm/minute. No difficulties were encountered during the operation, and glass cylinders 30 cm length by 12 cm diameter were obtained. As a matter of fact, the critical parameter is essentially the rate of cooling of the glass in order to obtain sufficient fluidity to allow downwardly sliding motion of the cylinder our of the crucible, and simultanously sufficient rigidity to prevent the glass from deforming.

Results of leaching tests

Lixiviation analysis were carried out to determine the degree of fixation of the deleterious metals into the glass matrix, and, thereby, the efficiency of the process according to the invention. Analysis of leachates that were obtained with a glass prepared with and without addition of silica were compared with the same analysis of leachates obtained with the ashes as such are reported in Table IV.

TABLE IV

COMPARISON BETWEEN LEACHATES OF ASHES AND GLASSES OBTAINED FROM SAID ASHES WITH AND WITHOUT ADDITIONAL SILICA

| Element | ashes | glass with silica | glass without silica |
|---|---|---|---|
| Arsenic (ppm-As) | 0.015 | 0.002 | <.002 |
| Cadmium (ppm-Cd) | 0.0037 | 0.0005 | <0.005 |
| Chromium (ppm-Cr) | 0.06 | <0.001 | <0.001 |
| Copper (ppm-Cu) | 0.355 | 0.13 | 0.06 |
| Mercury (ppb-Hg) | 3 | <0.5 | 0.7 |
| Nickel (ppm-Ni) | 0.29 | 0.024 | <0.01 |
| Lead (ppm-Pb) | 0.044 | 0.01 | 0.003 |
| Selenium (ppm-Se) | 0.004 | <0.002 | <0.002 |
| Zinc (ppm-Zn) | 0.71 | 0.04 | 0.01 |

As can be seen, the vitrification of the ashes substantially reduces the concentration of metals in the leachate.

It is worth mentioning that the lixivation tests were carried out on glass previously granulated into particles of less than 9 mm. Accordingly, the exchange surface between glass and the lixivation solution was much more important than in a "real" case, where glass would be stored in a much voluminous form.

CONCLUSION

The above reported tests clearly show that vitrification of the ashes coming from the incinerator of municipal sludges can efficiently be carried out in an arc plasma reactor of the above mentioned type. This vitrification can be carried out with or without addition of silica.

The energy requirement has been of 0.86 to 1.17 kWh/kg during these tests. No effort was made during these tests to optimize the process. In practice, the energy requirement can be minimized by a better control of the temperature of the bath, such a control resulting in a substantial reduction of the losses by volatilization. Accordingly, such a control should permit to substantially improve the final composition of the glass.

The tests that were carried out for tentively recovering iron by reducing the amount of oxides originally contained in the ashes using carbon have shown the recovery rate is low and not economically interesting at this stage, if one take into account the substantial amount of extra energy that was required to carry out the reduction reaction, notwithstanding the cost of the reducing agents for use to carry out the same.

The lixivation tests that were carried out onto the samples of glasses that were obtained have shown that the immobilization of the deleterious metals inside the glasses is very good. As a matter of fact, the amount of metals that were lixiviated from the glass is 10 times lower than the amount that is lixiviated from the ashes.

Accordingly, vitrification of the ashes in an arc plasma reactor is an efficient and safe method for immobilizing hazardous waste in pulverulent form.

What is claimed is:

1. A process for immobilizing ashes by vitrification thereof, comprising the steps of:
   a) providing a plasma reactor of the falling film type, said reactor comprising a sleeve having a vertical axis in which an axial, arc melts and treats a load tangentially injected or otherwise blown in a cyclonic manner into the sleeve while said load falls down by gravity along the wall of the sleeve and accumulates at the bottom of the reactor in the form of a liquid bath;
   b) feeding said ashes as said load into the reactor either alone if said ashes contain a sufficient amount of silica to make them self-vitrifying, or in admixture with silica or another glass-forming agent; and
   c) controlling in a very precise and adequate manner the temperature of the liquid bath that accumulates at the bottom of the reactor and consists of glass, in order to reduce as much as possible the formation of fumes and the risk of evaporation.

2. The process of claim 1, comprising the additional steps of:
   recycling the fumes generated inside the reactor to said reactor together with the load in order to minimize losses.

3. The process of claim 2, wherein said recycling is carried out through an industrial dust filter and wherein only dust recovered within said dust filter be recycled with the load to the reactor.

4. The process of claim 11, wherein said reactor comprises a hot tip cathode cooled with water and operates in an arc transferred mode, and wherein said feeding step (c) is carried out by tangentially injecting the ashes to be vitrified into the sleeve by means of a carrier gas.

5. The process of claim 1, wherein said reactor is an arc plasma reactor having a graphite electrode and operating in a transferred arc mode.

6. The process of claim 1, wherein said reactor is provided with a door in which other wastes to be encapsulated can be thrown into the liquid bath.

7. The process of claim 1, wherein the ashes to be immobilized come from an incinerator of hazardous or biomedical wastes.

8. The process of claim 1, wherein the ashes to be immobilized come from an incinerator of waste water treatment sludges.

* * * * *